Jan. 9, 1968

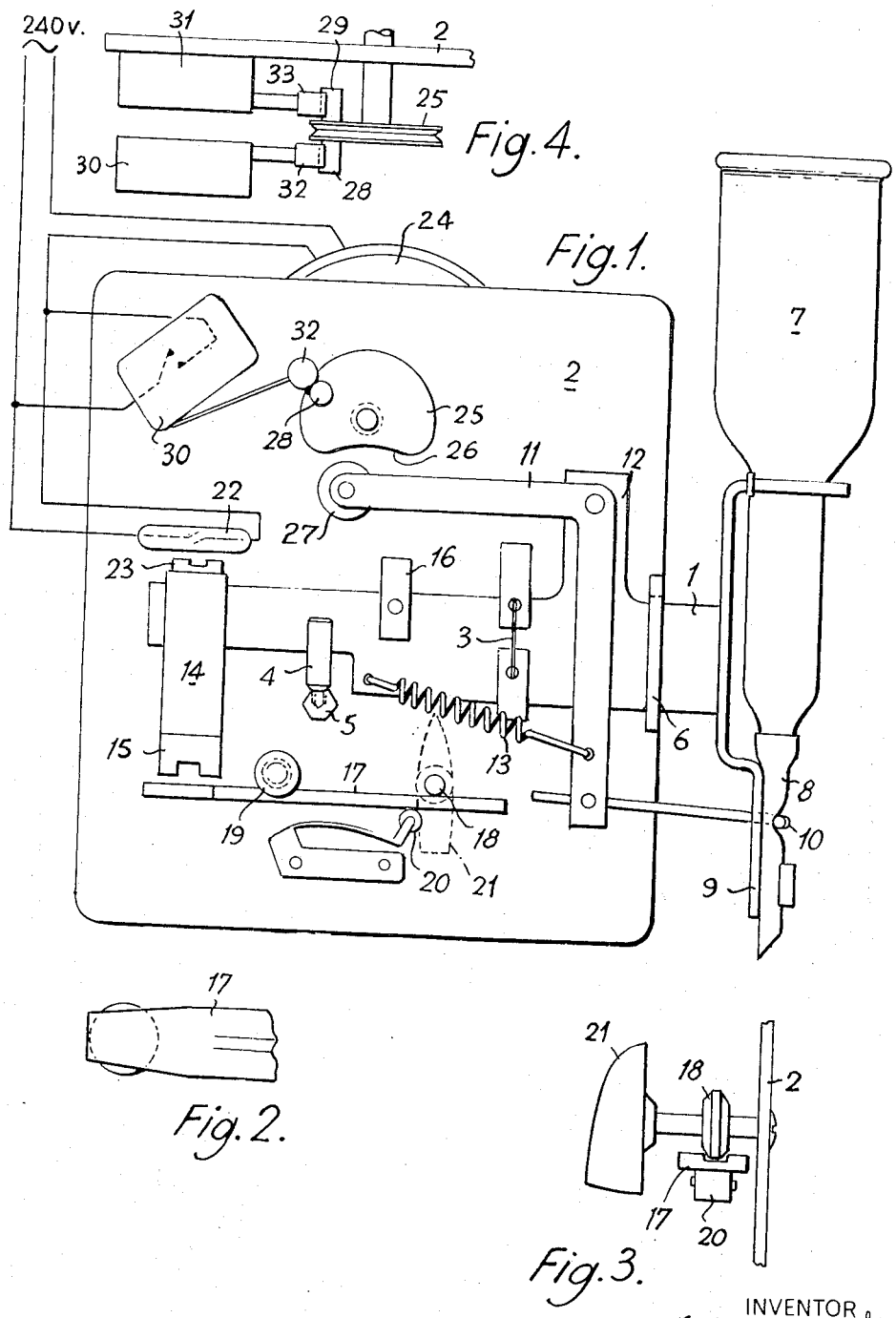

B. M. WRIGHT 3,362,491

GRAVIMETRIC FRACTION CUTTER

Filed July 29, 1965

INVENTOR
Basil Martin Wright
BY
Jacobs & Jacobs
ATTORNEYS

United States Patent Office 3,362,491
Patented Jan. 9, 1968

3,362,491
GRAVIMETRIC FRACTION CUTTER
Basil Martin Wright, Rickmansworth, England, assignor to National Research Development Corporation, London, England, a British corporation
Filed July 29, 1965, Ser. No. 475,741
Claims priority, application Great Britain, July 30, 1964, 30,206/64
4 Claims. (Cl. 177—114)

ABSTRACT OF THE DISCLOSURE

A fraction cutter for delivering a known weight of a substance having a balance arm with a receiver attached to it at one end. When a sample of the substance of the required weight has been collected in the receiver the balance arm tips causing the sample to be delivered and causing the operation of control means which mechanically control the return of the balance arm to its initial position.

Figure 5:
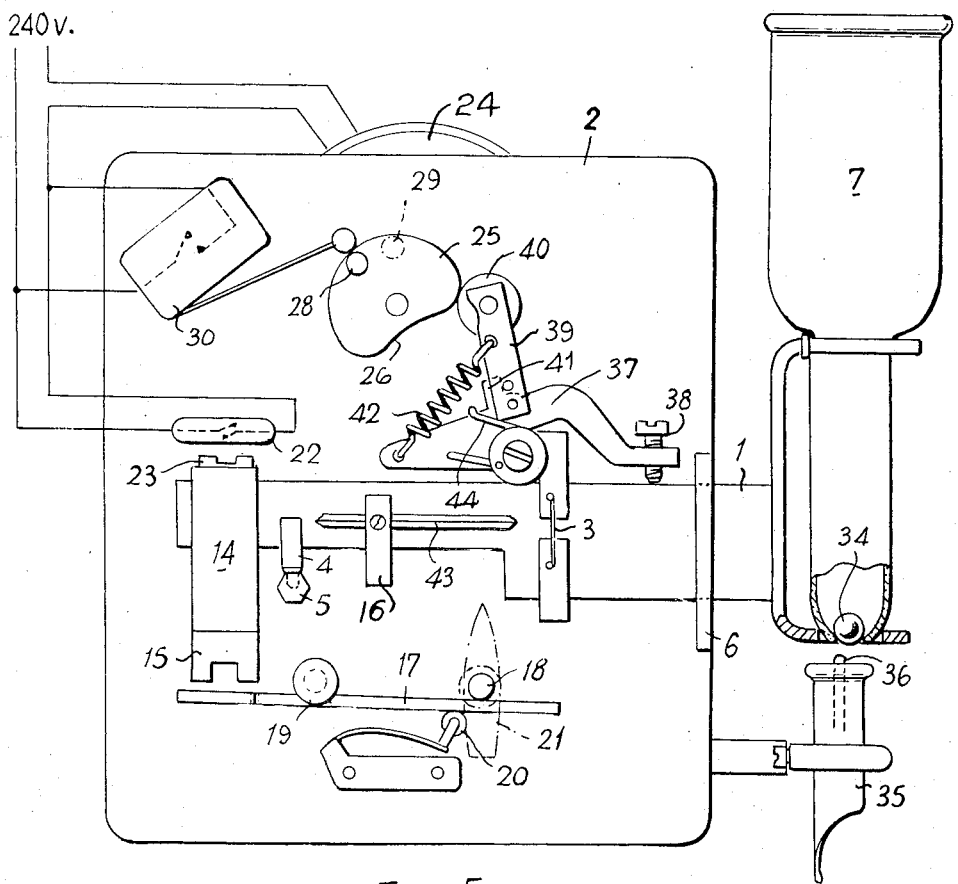

This invention relates to apparatus for delivering a known weight of a substance and in particular to apparatus for the automatic collection and delivery of fractions from a chromatographic colmun.

An apparatus for the collection of equal serial volumes or masses from a chromatographic column must fulfill a number of requirements. For example, the magnitude of each fraction must not vary by more ±5% or in some cases ±0.5%: the collector must operate accurately although the rate of delivery may vary, for example, between 1 to 15 ml. per minute; the flow through the column must not be altered or its rate appreciably varied; the apparatus must not be delicate or require difficult adjustment as it is required for use as a routine tool; and the device must not only arrange for the correct quantity to be delivered into a receptacle but must also trigger off a mechanism which will move the filled receptacle away and substitute any empty one.

Methods based on the collection of fractions of equal mass have hitherto been found unsatisfactory for small masses owing to the small forces available for operating the mechanisms involved in the apparatus. To weigh, say, 5 grams with 5% accuracy means that the force available for triggering the mechanisms when each fraction has been collected is only 0.25 gm. weight whereas the weight of the fraction plus its container will be ten or more grams.

It is the object of the present invention to provide an apparatus capable of delivering a known weight of a substance with a relatively small margin of error.

Accordingly, the invention provides apparatus for delivering a known weight of a substance comprising a balance arm adapted to carry a receiver for the substance and loaded in an initial position on one side of a position of balance and closure means biassed to close the outlet of the receiver, the balance arm being arranged to move to the other side of the balance position when the weight of substance added to the receiver reaches a known value, and control means operated by the said movement of the balance arm to actuate the closure means to open the outlet of the receiver for a limited time, and control means operated by the said movement of the balance arm to return the balance arm to its initial position.

The balance arm is preferably in the form of a beam supported by a pivot at a point between its ends and adapted to carry a receiver at one of its ends and having loading means at its other end. Since the arm will move from its initial position to the other side of its balance position when the total moment of the side of the arm carrying the receiver becomes greater than the total moment of the side of the arm having loading means it is desirable that the loading means should be adjustable to give different loading means so that the instrument can be set up to measure different weights of material.

One form of adjustable loading means comprises a magnet attached to the beam and a movable armature made of low remanence iron located in the vicinity of the magnet and mounted so that its separation from the magnet, and thus the force which it exerts, may be varied.

A requirement of this system is that the beam should be mounted in a kinematically stable manner so that each time it returns to its initial position the distance between the magnet and the armature is the same. The beam may for example be suspended from strip hinges and have a peg or ball projecting from its lower surface at the loaded end to locate a hole in a pillar attached to the back plate of the instrument. The armature should also be kinematically mounted. The armature movement may be calibrated to correspond with the weight of the sample to be collected and it is therefore desirable to have a further adjustable means for loading, for example, in the form of a sliding weight mounted on top of the arm to compensate for small differences in the weight of the collecting vessel.

The closure means may be, for example, a pinch-cock or a ball valve.

The control means operated by movement of the balance arm to return the arm to its initial position and to actuate the closure means may be a switch in the control circuit of a servo mechanism. If the servo mechanism is electrically operated the switch may be a normally open reed switch mounted above the end of the balance arm carrying the magnet and arranged to be closed by the attraction of a small magnet mounted on the balance arm when the arm tips.

When a delicate suspension system such as strip hinges is used the servo-mechanism should be designed to return the arm to its initial position and operate the closure means without imposing any substantial strain on the suspension system.

A fraction cutter according to the invention will be described with reference to the accompanying drawings of which FIGURE 1 is a diagrammatic front elevation of one embodiment of the invention showing the moving parts, FIGURE 2 is a top view of the armature shown in FIGURE 1, FIGURE 3 is a side elevation of the armature controlling mechanism, FIGURE 4 is a top view of the cam and microswitches shown in FIGURE 1, and FIGURE 5 is a diagrammatic front elevation of a second embodiment of the invention.

A balance arm 1 is supported from the back plate 2 of the instrument by mean of two strip hinges 3 one on either side, each consisting of a strip of "melinex," a flexible tough plastic, having either end clamped in a metal clamp, the clamp on one end being attached to the beam 1 and the clamp at the other end being attached to the back plate 2. Only one of the hinges 3 can be seen in the drawing.

On the under surface of the balance arm 1 is a pointed peg 4 which comes to rest in a circular hole in a pillar 5 attached to the back plate 2. The peg 4 locates precisely in the hole in the pillar 5 and together with the two strip hinges 3 forms a stable kinematic three-point support for the balance arm 1. A guard 6 in the form of a slotted plate attached to the back plate 2 of the instrument limits the upward and lateral movement of the beam 1 so that the hinges 3 cannot be twisted or compressed.

A receiver 7 for the chromatographic sample is carried in a support at one end of the balance arm 1, and is located positively in position by a spring across the hole in which it rests. The receiver 7 has an expanded upper portion and a narrower lower portion terminating in a nozzle fitted with a short length of flexible tubing 8 made of silicone rubber. The length of flexible tubing 8 rests against a platform 9 and is normally closed by a pinch-cock 10 of bent wire which pulls the tubing 8 back against the platform 9 (in FIGURE 1 the tubing 8 is shown closed). The pinch-cock 10 is attached to one end of a bell crank lever 11 mounted on a projection 12 extending upward from the balance arm 1 and is pulled towards the platform 9 by a spring 13.

The receiver 7 is counterbalanced by a brass weight 14 carrying a permanent magnet 15 attached to the end of the balance arm 1 and an adjustable weight 16 resting on top of the balance arm 1 which can be moved along the arm to allow for small variations in the weight of the receiver 7 and is secured in position by a locking screw. The receiver 7 and its contents are further counterbalanced by means of the pull of the magnet 15 on an armature 17 made of Swedish iron located below the magnet 15. The upper surface of the armature 17 rests against a control roller 18 and an idler roller 19 and the armature 17 is pressed against them by a spring loaded roller 20 acting on its lower surface. The control roller 18, which has a tapered profile and rides in a groove in the upper surface of the armature 17, may be turned by a knob 21 thus adjusting the position of the armature 17 with respect to the magnet 15. The three rollers 18, 19 and 20 support the armature 17 in a kinematically stable manner. The end of the armature 17 is shaped as shown in FIGURE 2 to give a suitable relationship between the position of the knob 21 and the pull of the magnet 15 on the armature 17.

Above the weight 14 is a normally open reed switch 22; a magnet 23 on top of the weight 14 closes the reed switch 22 when the arm 1 is tipped. The reed switch 22 is in the control circuit of an electrical motor 24 which operates a cam 25 having a recess 26. A roller 27 carried on the arm of the bell-crank lever 10 lies immediately below the cam 25.

The cam 25 has a concave rim and the roller 27 on the bell-crank lever 11 has a convex rim so that when the parts move in operation they line up in the same plane ensuring that the peg 4 enters the hole in the pillar 5. This is necessary because the strip hinges 3 have very little resistance to torsion in a horizontal plane although they are very stable in the plane of the strips.

The cam 25 carries on each side a stud (28, 29). The studs 28 and 29 operate respectively on two microswitches 30 and 31 by actuating the rollers 32 and 33. The switch 30 is normally closed and is in parallel with the reed switch 22. The switch 31 operates a fraction collector (not shown) through an independent circuit.

The instrument is prepared for use by setting it up empty with a clean dry receiver 7 and adjusting the position of the sliding weight 16 until the balance arm 1 is exactly balanced when the armature 17 is at the end of its travel away from the magnet 15. Provided the receiver 7 is not changed it will then stay in balance but if the vessel has to be replaced the balance can be reset by means of the sliding weight 16. The knob 21 controlling the position of the armature 17 is empirically calibrated to indicate the weight of liquid which may be collected in the collecting vessel 7 before the balance arm 1 tips by placing different known weights of liquid in the collecting vessel 7 and adjusting the position of the knob 21 until the balance arm 1 is exactly balanced. Provided the instrument is kept level this calibration is quite reliable though for acurate work a more exact weight can be set by the operator each time the instrument is used. In any case the weight delivered remains the same within narrow limits so long as the instrument is left undisturbed. The limit to the accuracy for small weights is the completeness with which the receiver 7 will empty.

In operation, the instrument is connected to a suitable fraction collector and A.C. mains supply and set to determine the desired weight, say 5 grms. When the fraction reaches 5 grms. the balance arm 1 tips and the small magnet 23 on the weight 14 approaches the reed switch 22 and closes it. The motor 24 then rotates the cam 25 so that the studs 28 and 29 release the rollers 32 and 33 operating the microswitches 30 and 31 shorting out the reed switch 22. The cam 25 then pushes the balance arm 1 back into position and then actuates the bellcrank lever 11 against the pull of the spring 13 opening the pinch-cock 10 and allowing the fraction to run out. The time of the rotation of the cam 25 is about 10 seconds allowing the receiver 7 to empty completely even if filled with its full load of 50 grams. When the cam 25 completes its rotation the roller 27 on the bell crank lever 11 again falls into the recess 26 in the cam 25, so that the pinch-cock 10 is closed, and the studs 28 and 29 operate the switches 30 and 31, stopping the motor 24 and switching on the fraction collector which thus moves only after the discharge from the receiver 7 has ceased.

When the apparatus is not in use it is preferably left with the pinch-cock 10 open so that the tube 8 is not compressed and does not develop a set. This can be done by switching off the mechanism while the motor 24 is running and the cam 25 is part way on its revolution.

An alternative embodiment of the invention, designed for use when rubber or plastic are objectionable, is shown in FIGURE 5. In the embodiment, the lower end of the receiver 7 is ground internally to an angle of 60° and polished. An accurately spherical glass ball 34 rests in the conical recess thus formed, and acts as an efficient closure.

Below the receiver is a short glass nozzle 35 having a funnel-shaped inlet and an oblique outlet. A glass peg 36 fused to the inside wall of the nozzle 35 projects upwards and is positioned so that when the balance arm 1 tips the peg 36 displaces the ball 34 from its seating allowing the liquid to run out of the receiver 7 and through the nozzle 35.

A lever 37 pivoted on the back-plate 2 of the instrument is mounted above the balance arm 1 replacing the bell-crank lever 11 described in the previous embodiment. At one end the lever 37 carries an adjusting screw 38. Pivoted on the lever 37 is an arm 39 which carries a convex rimmed roller 40 which rests against the cam 25. The arm 39 is pulled against a stop 41 by a spring 42. The roller 40 is urged in the direction of the cam 25 by a light spiral spring (not shown) which acts on the lever 37 and is mounted on the axle on which the lever 37 pivots. The sliding weight 16 fits over the underside of the balance arm 1 and is secured in place by a locking screw running in a groove 43.

The studs 28 and 29 on the cam 25 are not opposite one another, as in the embodiment previously described, but are off-set.

In operation, when the instrument is ready to receive a sample, the parts are in the position shown in FIGURE 5, with the roller 40 on the arm 39 resting on the cam 25 about half way up its track. When the required sample has been collected the balance arm 1 tips and the magnet 23 actuates the reed switch 22. The motor 24 then rotates the cam 25 which presses on the arm 39 and moves the lever 37 until the adjusting screw 38 is just resting on the balance arm 1, which is thus prevented from tipping back when the fraction runs out until the roller 40 has fallen into the recess 26 in the cam 25. When the roller 40 falls into the recess 26 in the cam 25 the lever 37 pivots and allows the balance arm 1 to return to its former position. With small fractions the pull of the magnet 15 may not be sufficient to counteract the pull of attraction of the magnet 23 on the reed switch 22. In this case the plain arm of the lever 37 presses against the balance arm 1 and restores to its former position. The cam 25 continues to rotate until it reaches the position shown in FIGURE 5 when the stud 28 operates the micro-switch 30 and stops the motor 24.

A locking spring 44 is provided so that when the instrument is not in use it may be left with the plain arm of the lever 37 pressing against the balance arm 1 and locking it in position.

I claim:

1. Apparatus for delivering a known weight of a substance comprising a balance arm adapted to carry a receiver for the substance having an outlet, said balance arm being loaded in an initial position on one side of a position of balance, and arranged to move to a second position on the other side of the position of balance when the weight of the susbtance added to said receiver reaches a predetermined value, closure means biased to close the outlet of said receiver, control means operated by the said movement of the balance arm to actuate said closure means to open the outlet of said receiver for a limited time, and control means operated by the said movement of said balance arm to return said balance arm to its initial position comprising a cam, a lever and a roller mounted upon said lever, arranged so that during the returning movement of said balance arm to its initial position said roller is in mechanical contact with said cam, and said lever is moved by said cam to control the returning movement of said balance arm by mechanical contact.

2. Apparatus as claimed in claim 1 wherein said lever is a bell crank lever, having a first and a second arm, pivoted on said balance arm, said first arm carrying said roller and said second arm operating said closure means.

3. Apparatus as claimed in claim 1 wherein the said lever is pivoted above the said balance arm, said lever having a first and second arm, said first arm carrying said roller and said second arm being positioned above said balance arm to control said returning motion of said balance arm by mechanical contact.

4. Apparatus as claimed in claim 2 wherein said closure means comprises a pinchcock.

References Cited

UNITED STATES PATENTS

| 2,475,684 | 7/1949 | Weckerly | 177—194 |
| 2,995,783 | 8/1961 | Lytton | 177—114 |
| 3,219,132 | 11/1964 | Nowak | 177—114 X |
| 3,236,321 | 2/1966 | Katagiri et al. | 177—114 |

RICHARD B. WILKINSON, *Primary Examiner.*

GEORGE H. MILLER, JR., *Assistant Examiner.*